Aug. 28, 1962  A. BOSCHI  3,051,469
ANTIVIBRATING WASHER FOR HELICAL SPRING SUSPENSIONS
Filed Sept. 11, 1961  3 Sheets-Sheet 1

Aug. 28, 1962  A. BOSCHI  3,051,469
ANTIVIBRATING WASHER FOR HELICAL SPRING SUSPENSIONS
Filed Sept. 11, 1961  3 Sheets-Sheet 2

Aug. 28, 1962   A. BOSCHI   3,051,469
ANTIVIBRATING WASHER FOR HELICAL SPRING SUSPENSIONS
Filed Sept. 11, 1961   3 Sheets-Sheet 3

United States Patent Office 3,051,469
Patented Aug. 28, 1962

3,051,469
ANTIVIBRATING WASHER FOR HELICAL SPRING SUSPENSIONS
Antonio Boschi, Milan, Italy, assignor to Societe Applicazioni Gomma Antivibranti S.A., G.A., S.p.A., Milan, Italy
Filed Sept. 11, 1961, Ser. No. 137,101
Claims priority, application Italy Oct. 26, 1960
4 Claims. (Cl. 267—33)

This invention relates to helical spring suspensions, particularly for motor vehicles, of the type in which the helical spring is axially compressed between a pair of metallic surfaces, respectively connected with the sprung and unsprung masses of the vehicle.

It is known that, in operation, the unsprung masses and the spring itself are subjected to vibrations, the frequency range of which extends from a fraction of cycles per second (c.p.s.) to several thousands of cycles per second (c.p.s.) and that sub-acoustical frequencies are generally efficiently blocked by the spring, which stops their propagation to the sprung masses (body) of the vehicle.

On the contrary, the spring does not stop the acoustical and higher frequencies, which latter are even generated and emphasized in the spring under the effect of impulses coming from unsprung masses.

The propagation of such frequencies to the vehicle body involves dangerous fatigue stresses and hardening of metal in the joints and welds of the body, and, on the other hand, causes a disturbing noise for passengers.

It has been already attempted to avoid the above inconvenience by interposing between the ends of the helical spring and the respective metallic abutment surfaces rubber washers of a flat, L-shaped or U-shaped cross-sectional profile, the elastic hysteresis was deemed sufficient to stop the propagation of acoustical and higher frequencies. Such attempts gave rise to a partial success only, in the sense that frequencies higher than about 5000 c.p.s. only were sufficiently stopped, while on the contrary, the physiologically disturbing frequencies ranging between 40 c.p.s. and about 5000 c.p.s., were absorbed in an insignificant amount.

This invention attains decidedly superior results by providing an antivibrating washer of rubber characterized by the fact that one at least of the load-transmitting faces of the washer presents an alveolar surface. The alveoli are advantageously defined by a pattern of annular and radial ribs on the respective face of the washer and the best conditions are obtained when the projected (plan) area of the said alveoli is comprised between about 2/5 and 2/3 of the projected area of the said face, and when the rubber material of the washer has a Shore hardness between 60 and 85 with corresponding elastic modulus between 40 and 80 kg./cm.². The invention relates also to a helical spring suspension, particularly for motor vehicles, including an antivibrating washer of the type defined above.

Further features and advantages of the invention will result from the following description with reference to the accompanying drawing in which.

Figure 1:
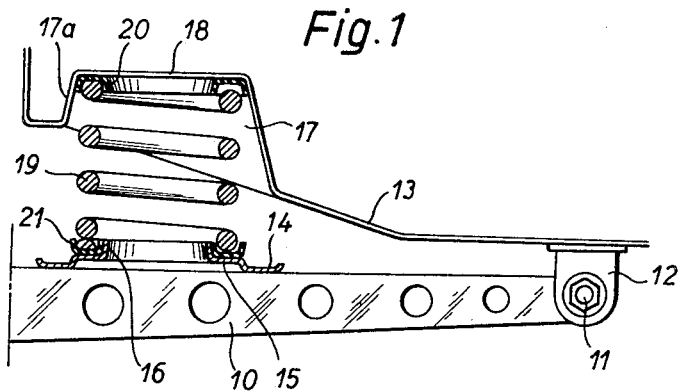
FIGURE 1 shows schematically a helical spring independent suspension to which the present invention applies.

FIGURE 1 illustrates a typical independent suspension, including a swinging arm 10 having one end articulated by means of a resilient joint 11 to a support 12 fast with the bottom 13 of a vehicle body.

The opposite end of the arm 10 carries a road wheel in a manner known in the art. To a middle region of the arm 10 is welded a circular plate 14 of stamped sheet steel, formed with a flat annular step 15 inwardly bordered by a circumferential upstanding lip 16. Above the plate 14, the bottom 13 of the body is embossed so as to form a frusto-conical cavity 17 having a bottom 18. A helical spring 19 is compressed between the plate 14 and the bottom 18; the upper end of the spring bears against the bottom 18 through a rubber washer 20, and the lower end of the spring bears against the step 15 on the plate 14 through a rubber washer 21. In the embodiment shown the two washers 20, 21 are channel-shaped and are similar to each other though this is not strictly necessary.

Figure 2:
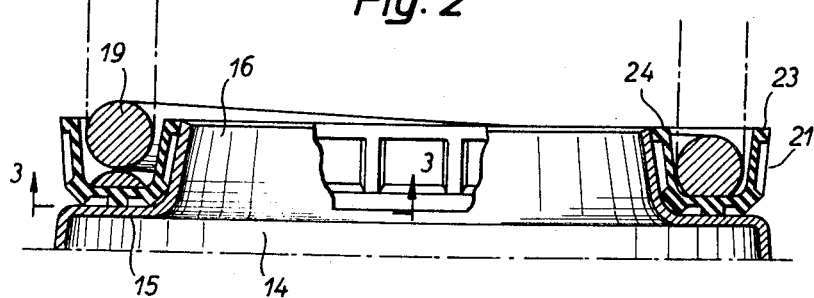
FIGURE 2 shows in diametrical sectional view an abutment group for the helical spring.
Figure 3:
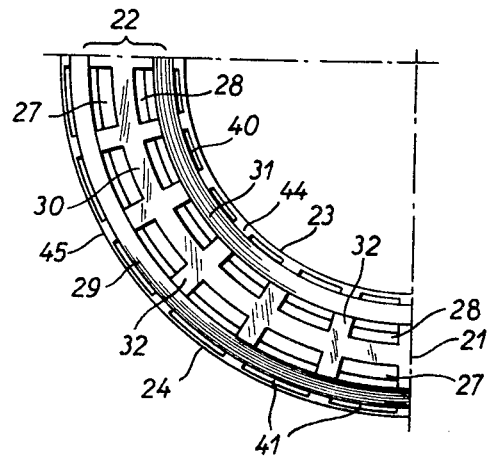
FIGURE 3 shows a quadrant of the antivibration washer, seen in the direction 3—3 of FIGURE 2.
Figure 4:
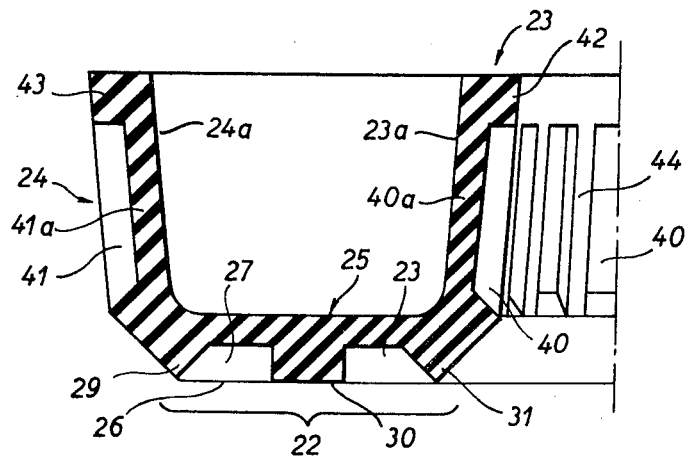
FIGURE 4 shows, in a relatively great scale, the cross sectional shape of the washer.

Referring now to FIGURES 2–4, which relate to lower washer 21, it is necessary to point out that the washer includes an annular load-transmitting zone 22 formed by the bottom of the U-shaped washer, and two circumferential inner and outer flanks 23, 24, respectively. The bottom zone 22 presents two load-transmitting faces, the inner one 25, against which abuts the lower end turn of the spring 19, and the outer one 26 applied against the flat step 15 on the plate 14. The inner face 25, as well as the inner surfaces 24a, 25a of the flanks 24, 25, are smooth. On the contrary, the outer face 26 presents two circular concentric series of alveoli 27, 28 defined by three annular concentric ribs 29, 30, 31, and by numerous (twenty-four in the embodiment shown) radial ribs 32 angularly uniformly spaced therebetween.

In this way forty-eight alveoli 27, 28 are obtained, which are uniformly distributed on the surface 26 and open towards the step 15 (FIGURE 2) on the plate 14. In the so assembled condition, the washer rests on the step by means of a continuous closed network of ribs 29—32, whereby the alveoli 27, 28 provide, between the step and washer, hermetically closed air chambers.

The total area in projection on the step 15 of the alveoli 27, 28 is comprised between 2/5 and 2/3 of the total projected area of the lower face 26 of the washer and the rubber of which the washer is made advantageously has a Shore hardness between about 60 and 85, with the corresponding elastic modulus between 40 and 80 kg./cm.². In these conditions, the depth of the alveoli 27, 28 should amount at least to the half of the thickness of the washer bottom zone 22 inclusive ribs.

It is to be understood that the conditions set forth above define limits within which the best results are obtained, which are advantageous in practice under any point of view; beyond the said limits, the results obtained present poor practical interest.

It should be also pointed out that the diameter of the central annular rib 30 is the mean diameter of the washer base 22, whereby the load acting between the spring 19 and plate 14 is localized prevailingly on the said rib 30 and on the radial ribs 32, without annulling the alveoli 27, 28. Furthermore, the alveoli 27, 28 are not to be confused in practice with simple annular grooves on the face 26, or with alveoli which are usually found in the expanded rubber (sponge-rubber); in fact, it has been found that in practice such expedients do not give any valuable effect.

Comparing between them the abutment groups relative to the opposite ends of the spring 19, as shown in the drawings, it will be seen that in the lower group the contact with the metallic part (plate 14) extends also on the inner circumferential flank 24 of the washer 21, while in the upper group the contact with the metallic part extends on the outer circumferential flank of the washer 20. Thus, in the first group, the inner flank 24 bears against the lip 16 on the plate 14, while in the second group the outer flank (similar to that 23 in FIGURE 2) bears against the frusto-conical wall 17a of the cavity 17. To prevent propagation of acoustical vibrations even through these contact zones, the outside surfaces of the two flanks 23, 24 present alveoli 40, 41, respectively, confined between circumferential ribs 31, 42 (respectively 29, 43) and axial ribs 44 (respectively 45), as shown in FIGURES 3 and 4.

Each rib 42, 43 forms a bead on the free edge of the respective flank 23, 24 while the ribs 31, 29 are the same which define also the alveoli 28, 27 on the surface 26 of the washer base 22.

As will be seen in FIGURE 3 the axial ribs 44, 45 actually are extensions of the radial ribs 32 on the surface 26. The bottom wall 40a, 41a of the respective alveoli 40, 41 is flat (FIGURE 4) and its thickness should not exceed the half of the total thickness of the respective flank.

Figure 5:
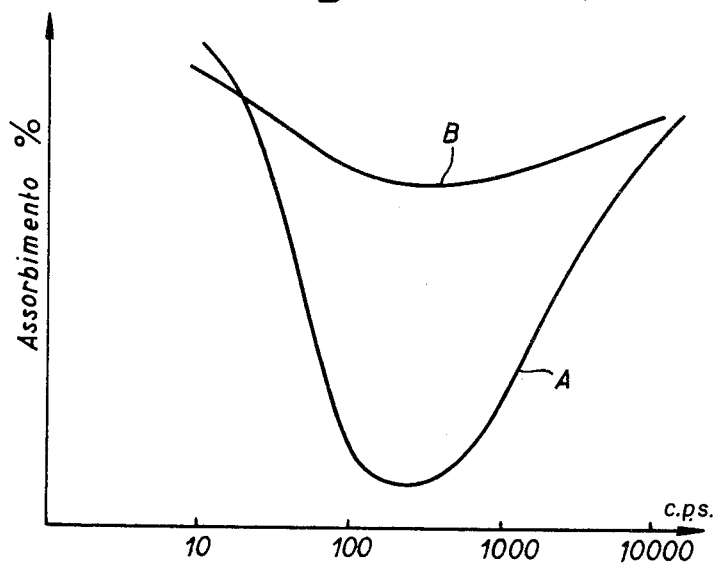
FIGURE 5 is a diagram "frequency/absorption percent," regarding a pair of antivibrating washers of the type illustrated in FIGURES 2–4, applied to a suspension according to FIGURE 1.

The diagram reproduced in FIGURE 5 represents the average of the results obtained after numerous tests made on suspensions of the type illustrated in FIGURE 1, including a first series of tests made on common antivibrating washers of plain rubber, and a second series of tests carried out on washers constructed and arranged as described above. Curve A refers to common washers and clearly shows the considerable drop of the percentage absorption of the vibrations in the range from about 25–30 c.p.s. to about 5000 c.p.s.

Curve B refers to a suspension constructed according to the invention and shows a clear improvement in the percentage absorption of the said vibrations.

On interpreting the results attained with the invention, several hypothesis have been put forth.

According to the hypothesis that presently seems the most reliable, the vibrations would be principally induced in the continuous network of ribs 29, 30, 31, 32, 42, 43, 44 and 45 and would be conveyed towards the diaphragms of reduced thickness (as i.e. 40a, 41a) forming the bottom of each alveolus 27, 28, 40, 41. In this way in each of these diaphragms four wave fronts would be obtained advancing towards the centre of the diaphragm from the four ribs delimitating it, with the result of a mutual extinction of the fronts. To this result also the closed air chambers would cooperate, formed by the alveoli 27, 28, in which the vibrations induced by a wave front would result in at least partial opposition to both the vibrations induced by the other wave fronts and those induced directly by the surrounding ribs.

However, it is to be understood that whatever thesis might be advanced, such thesis does not modify in any way the advantageous results obtained with the present invention.

Figure 6:
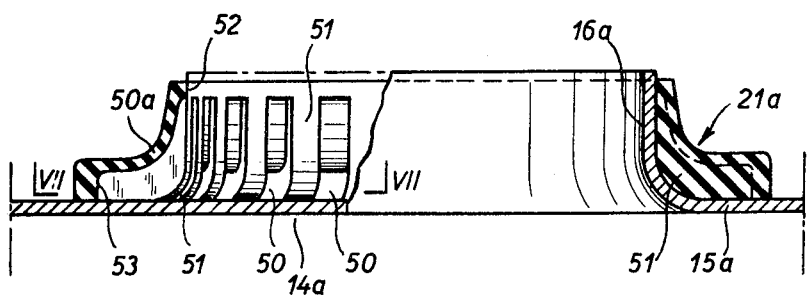
FIGURE 6 shows a further embodiment, in a view similar to that of FIGURE 2.
Figure 7:
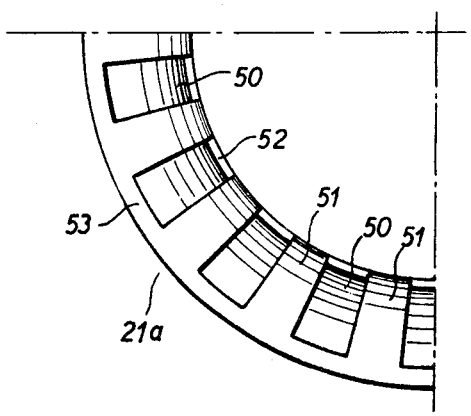
FIGURE 7 shows a quadrant of the washer according to FIGURE 6, seen in the direction 7—7.

In the embodiment shown in FIGURES 6 and 7, the sheet steel plate 14a is still shown forming an annular flat step 15a, the latter being inwardly confined by a circumferential erected lip 16a.

The rubber washer 21a here presents in L-shaped cross-section. Its surface turned towards the parts 15a, 16a of the plate 14a presents alveoli 50 defined by a series of radial ribs 51 and by two circumferential ribs 52, 53 on the inner and outer circumferential edges of the washer, respectively.

The bottom wall 50a of each alveolus is relatively thin and has a substantially regular thickness. As will be seen on the drawing, each alveolus 50 extends uninterruptedly along both the wings of the L-profile of the washer.

As to dimensional questions, it can be admitted that the total load-transmission area is represented by the quadruple of the area in projection of the quadrant illustrated in FIGURE 7, from which it will be seen that the area in projection of the alveoli 50 amounts to about ⅔ of the said total area. The inner circumferential rib 52 is not strictly necessary; the same remark applies also to the rib 42 on the washer 21 according to FIGURES 1–4.

But it is advisable to bear in mind that, firstly, the damping action of the closed alveoli is considerably greater than that of the alveoli communicating with the outer atmosphere and that, secondly, the ribs 42 and 52 form a concentrated rubber mass all around the free edge of the lip 16, respectively 16a, which damps the vibrations of the said edge. It is quite superfluous to state that the antivibrating washers 21 and 21a are rather forced on the respective lips 16, 16a so as to be in a close contact with such lips; the contact with the respective annular steps 15, 15a is naturally assured by the load burdening on the suspension.

What I claim is:

1. In a vehicle suspension comprising sprung and unsprung masses and a helical metal spring arranged to work under axial compression between the masses, an antivibrating group interposed between one at least of the masses and the respective end turn of the spring comprising an annular rigid abutment surface fast with the said one of the masses opposite the said end turn of the spring, and a rubber washer arranged between the said end turn and abutment surface for transmitting load therebetween, the said rubber washer including a load-transmitting face resting on the said surface comprising a closed network of annular and radial ribs defining therebetween a uniform pattern of alveoli the plan area of which is comprised between ⅖ and ⅔ of the plan area of the said load transmitting face, the said washer having a Shore hardness between 60 and 85 and a corresponding elastic modulus between 40 and 80 kg./cm.$^2$.

2. In the suspension as claimed in claim 1, each of the alveoli including a bottom wall having a thickness not exeeding the half-thickness of the washer in a zone immediately surrounding the respective alveolus.

3. In a vehicle suspension comprising sprung and unsprung masses and a helical metal spring arranged to work under axial compression between the masses, an antivibrating group interposed between one at least of the masses and the respective end turn of the spring comprising an annular rigid abutment surface fast with the said one of the masses opposite the said end turn of the spring, a rigid circumferential lip extending from the said surface towards the spring coaxially with the latter, and a rubber washer arranged between the said end turn and abutment surface for transmitting load therebetween, the said washer including a load-transmitting face abutting said surface having a pattern of uniformly distributed alveoli therein the plan area of which is comprised between ⅖ and ⅔ of the plan area of the load-transmitting face, and including moreover a circumferential flank portion of rubber superposed on the said circumferential lip also comprising a pattern of uniformly distributed alveoli in the face superposed on the lip.

4. In a vehicle suspension comprising sprung and unsprung masses and a helical metal spring arranged to work under axial compression between the masses, an antivibrating group interposed between one at least of the masses and the respective end turn of the spring comprising an annular rigid abutment surface fast with the said one of the masses opposite the said end turn of the spring, a rigid circumferential lip extending from the said surface towards the spring co-axially with the latter, and a rubber washer arranged between the said end turn and abutment surface for transmitting load therebetween, the said washer including a bottom portion and a circumferential flank portion superposed on the said abutment surface and lip, respectively, a closed network of annular and radial ribs on the surfaces of the washer superposed on the said abutment surface and lip defining therebetween a uniform pattern of alveoil the plan area of which is comprised between 2/5 and 2/3 of the plan area of the said surfaces of the washer, the washer having a Shore hardness between 60 and 85 and a corresponding elastic modulus between 40 and 80 kg./cm.²

References Cited in the file of this patent

UNITED STATES PATENTS

| | | |
|---|---|---|
| 2,308,964 | Saurer | Jan. 19, 1943 |
| 2,731,257 | Hansen | Jan. 17, 1956 |

FOREIGN PATENTS

| | | |
|---|---|---|
| 527,468 | Great Britain | Oct. 9, 1940 |

UNITED STATES PATENT OFFICE
CERTIFICATE OF CORRECTION

Patent No. 3,051,469                      August 28, 1962

Antonio Boschi

It is hereby certified that error appears in the above numbered patent requiring correction and that the said Letters Patent should read as corrected below.

In the grant, lines 2 and 12, and in the heading to the printed specification, lines 4 and 5, name of assignee, for "Societe Applicazioni Gomma Antivibranti S.A., G.A., S.p.A.", each occurrence, read -- Societa Applicazioni Gomma Antivibranti S.A.G.A., S.p.A. --.

Signed and sealed this 5th day of February 1963.

(SEAL)
Attest:

ERNEST W. SWIDER                      DAVID L. LADD
Attesting Officer                          Commissioner of Patents